Oct. 26, 1954   J. H. BESSER   2,692,418
PALLET HANDLING APPARATUS
Filed June 2, 1948   3 Sheets-Sheet 1
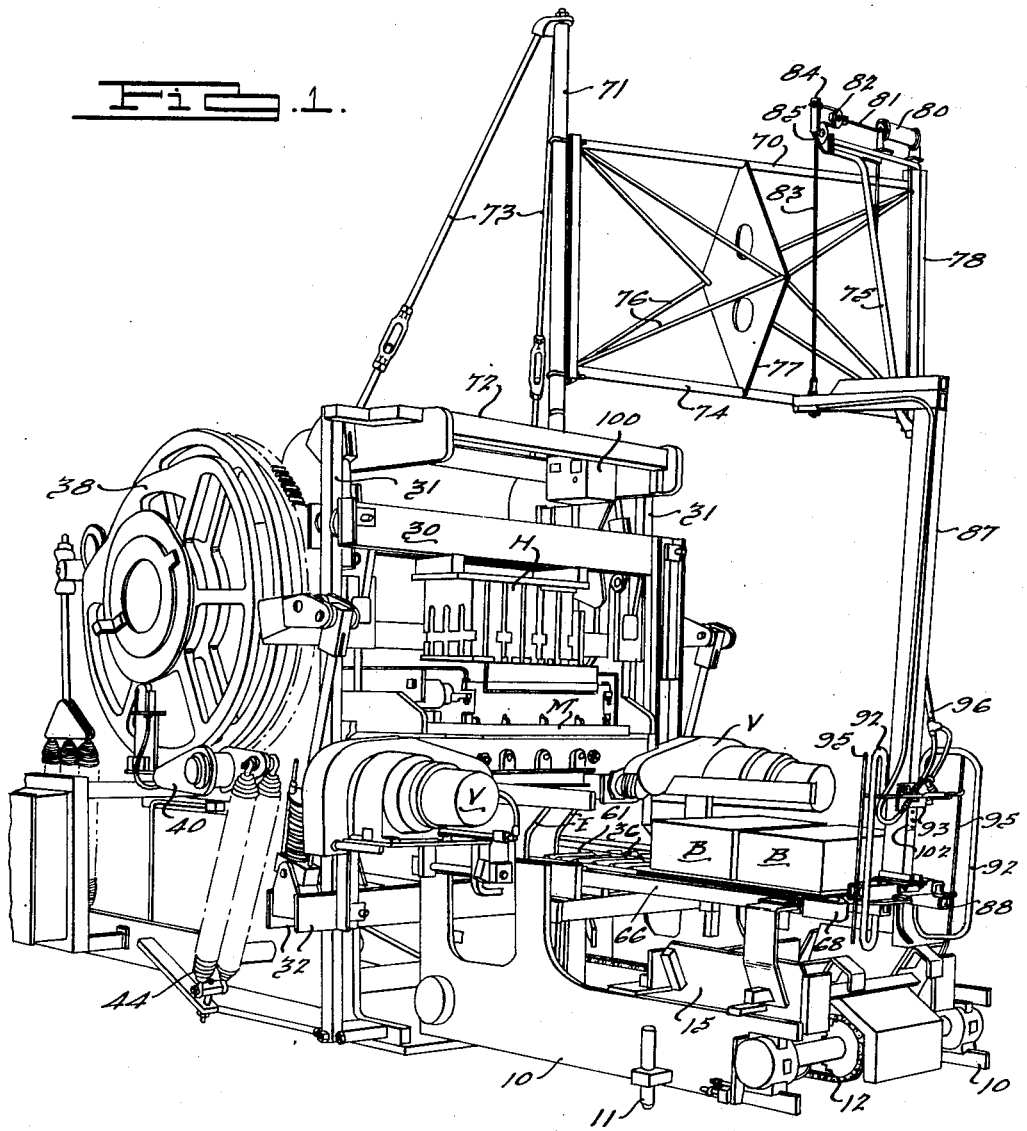
INVENTOR.
Jesse H. Besser
BY John F. Stark
ATTORNEY.

Oct. 26, 1954  J. H. BESSER  2,692,418
PALLET HANDLING APPARATUS
Filed June 2, 1948  3 Sheets-Sheet 2
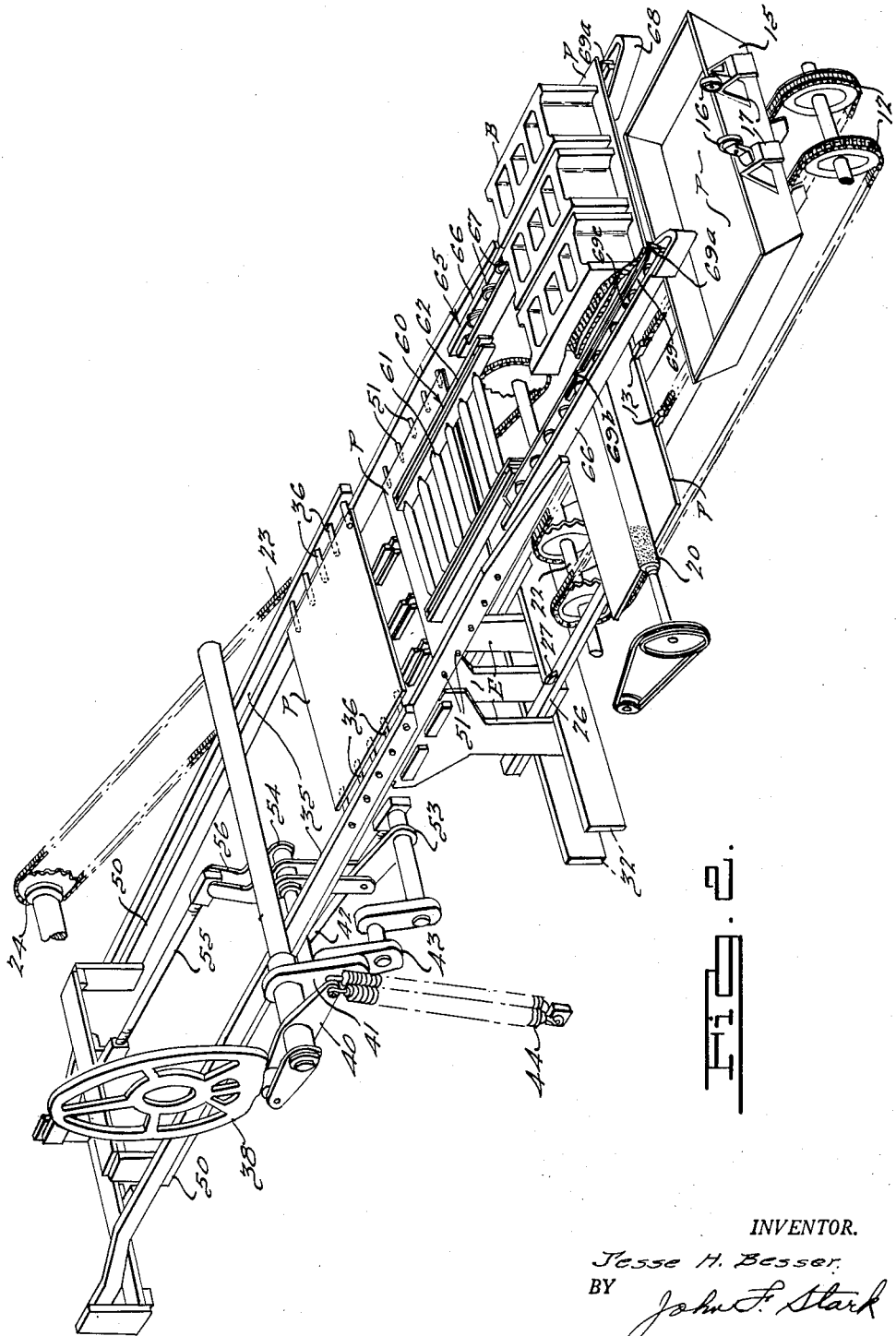
INVENTOR.
Jesse H. Besser.
BY John F. Stark
ATTORNEY.

Oct. 26, 1954  J. H. BESSER  2,692,418
PALLET HANDLING APPARATUS
Filed June 2, 1948  3 Sheets-Sheet 3
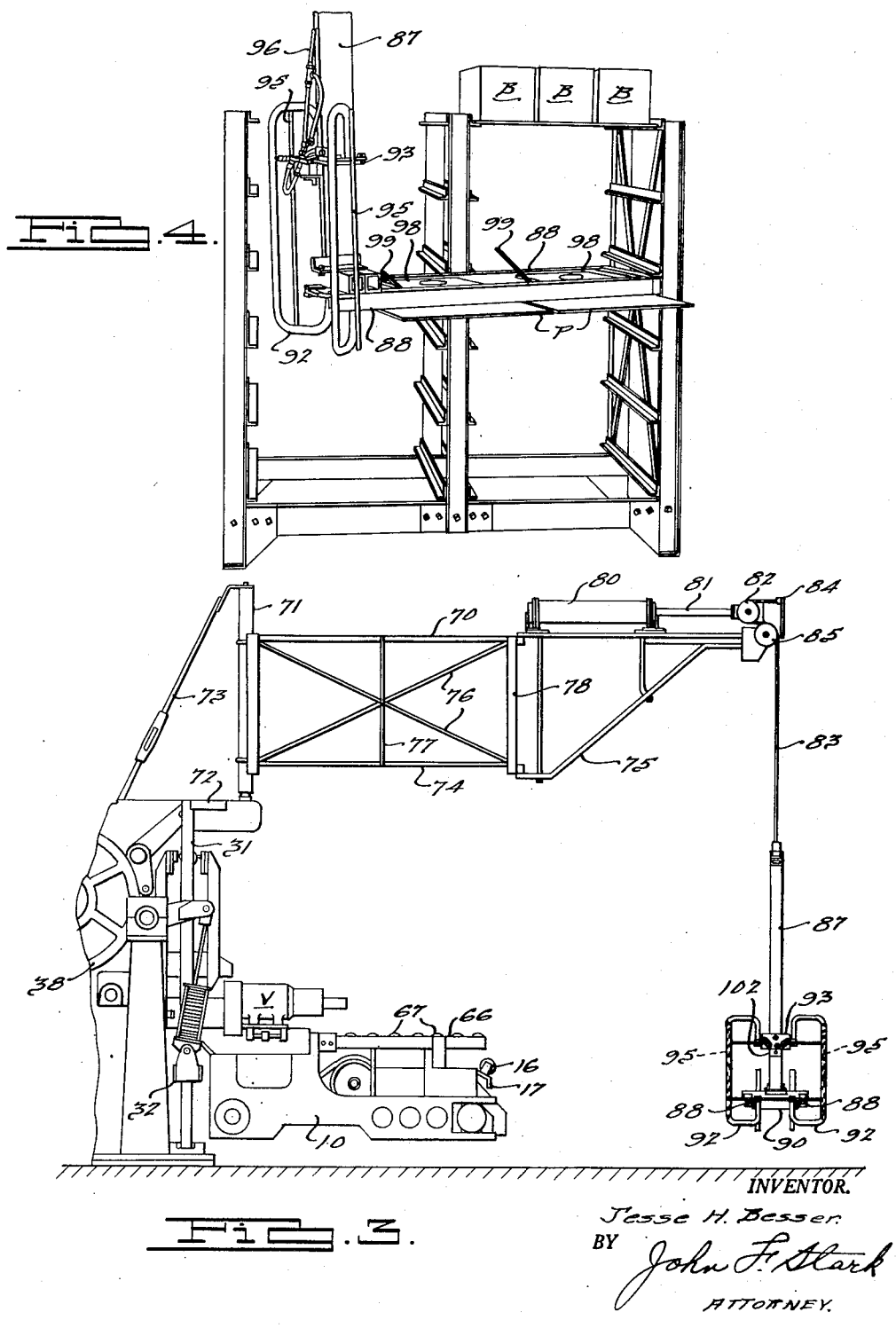
INVENTOR.
Jesse H. Besser.
BY John F. Clark
ATTORNEY.

Patented Oct. 26, 1954

2,692,418

UNITED STATES PATENT OFFICE 2,692,418

PALLET HANDLING APPARATUS

Jesse H. Besser, Alpena, Mich., assignor to Besser Manufacturing Company, Alpena, Mich.

Application June 2, 1948, Serial No. 30,717

1 Claim. (Cl. 25—1)

This invention relates to concrete products machinery in general, and, more particularly, concerns pallet handling apparatus and a method of offbearing freshly molded block loaded pallets.

Heretofore in the manufacture of building blocks molded from plastic materials such as concrete or cinders and the like, on a molding machine as described in United States Patent 2,275,676, separate operators were required to perform the duties of a front offbearer and a rear pallet loader. This division of work was necessitated because a multi-tiered rack of empty pallets were fed individually into the pallet supply hopper of the machine at the rear thereof while an operator working a powered offbearing hoist removed freshly molded block-loaded pallets at the front discharge or delivery face of the machine. The present invention has effectively eliminated the need for a separate pallet loading operator, among other things, while at the same time enabling the pallet offbearing operator to do more work with less effort.

Accordingly, to this end, among the objects of the present invention is the provision with a machine for molding building blocks, of a pallet handling apparatus operatively associated with the front or delivery face of the machine; the provision in a mechanism as above described of means interposed between a front pallet receiving hopper and the mold of the block machine comprising an oiling and/or cleaning stage.

Further objects and advantages of the present invention reside in the provision of a novel two pallet at a time offbearing hoist incorporating magnetic means on the underside of the forks thereof for retention of empty pallets to be returned to the front pallet feeder of the block machine, the provision in apparatus as above described of means to automatically cause separation of the magnetically retained empty pallets when presented to the front pallet supply hopper and at the same time concurrently offbear block loaded pallets from the molding machine; and the provision in an offbearing hoist of the character described of a knuckled supporting arm for horizontal movement thereof, and a fluid power operated cylinder horizontally disposed thereon for conservation of head room to enable extensive vertical movement of the pallet support through a depending flexible link member.

A further object and advantage of the present invention is the provision of a novel method and means for concurrently offbearing block loaded pallets from a block molding machine to a replaceable product receiver rack disposed adjacent to the delivery face thereof and returning magnetically held empty pallets from the rack to a front pallet receiver and cleaner operatively associated with the discharge or delivery face of the block machine.

Further and other objects and advantages of the present invention reside in the novel combination and arrangement of parts about to be described in the following specification, taken together with the accompanying drawings forming a part thereof, and more particularly set forth in the appended claims:

In the drawings like reference characters denote similar parts in the several views, and in which:

Fig. 1 is a perspective view of one embodiment of the present invention viewed from the left front delivery face of the block machine, including the novel front pallet feeder and offbearing hoist operatively associated therewith; and Fig. 2 is an extended diagrammatic perspective view of the front pallet feeder shown in Fig. 1; and Fig. 3 is a left side elevational view of a portion of the block machine of Fig. 1 and an extended view of the novel offbearing hoist connected thereto; and Fig. 4 is a perspective view of a replaceable multi-decked rack for reception of block loaded pallets and a fragmentary portion of the offbearing hoist just after deposition of a quantity of block loaded pallets has been made on the upper deck thereof and a load of magnetically retained empty pallets have been removed from the next lower deck of the rack.

In the drawings in Fig. 1 molding machines or presses of the general type shown have been arranged to automatically feed steel pallets into and longitudinally through the machine from the rear thereof to the front or discharge face by a feed mechanism, not shown, but generally assuming the form of a chain conveyor or some equivalent track system. At the rear, or in some cases side of the machine, a stack of pallets have been arranged in decked or stacked fashion in a hopper or pallet feeder supply magazine. One pallet at a time is removed from the bottom of the stack by lugs arranged at suitably spaced intervals on the chain conveyor and advanced to a molding position or station M in the front part of the machine. At the molding station suitable mechanism to be described, elevates the pallet out of engagement with the chain conveyor lugs and positions it against the bottom of an open mold box, to thus constitute the bottom wall of the mold. Core members or division plates, within the mold box, determine the particular shape of the block or article to be molded and extend down into contact with the top surface of the underlying pallet. A plastic agglomerate or concrete mix is then charged into the mold whereupon the mold box and pallet are subjected to a more or less intense vibratory or jolting action to cause the mix to uniformly settle within the confines of the mold and about the cores to produce a dense homogeneous structure. A pressure or stripper head H is then urged downwardly into contact with the vibrating or jolting mix within the mold to exert a nominal pressure thereupon and to finish the molding action of the machine by pressing and leveling the top of the mix within the mold and to complete the formation of the block to the desired height. The green molded block is then stripped from the mold by downward movement of the pressure or stripper head through the mold box against the resilient action of the underlying pallet support and elevator thereby leaving the molded green block in free standing position below the mold upon the pallet. Thereafter, the pressure head is elevated away from the green block and the loaded pallet is advanced away from the molding station unto a discharge conveyor.

In the foregoing paragraph a general description and sequence of operations of the molding machine as now in use has been made. Since the pallets are fed into the supply hopper or magazine at the back or rear face of the machine longitudinally opposite from the front or discharge face, it will be apparent separate operators were necessary for feeding pallets into the feeder magazine at the rear and offbearing green molded block loaded pallets at the front face of the machine to keep up with the continuous automatic output of the machine. Accordingly, as best shown in Figs. 1, 2 and 3, a front pallet feeder has been integrated with the front or discharge face of the machine generally below and in parallel alignment with the longitudinal axis of the discharge conveyor. More particularly, having reference to Figs. 1 and 2, a pair of spaced upright frame side members 10, have floor leveling studs 11 suitably secured on the sides thereof, and a chain conveyor 12 transversely disposed between the frame members extending from the outer ends thereof back to the pallet elevator E beneath the molding station M previously mentioned. Suitably spaced in predetermined position along the chain conveyor are lugs or dogs 13 arranged to intercept an edge of the pallets P which are removed one at a time from a tapering open bottomed hopper or magazine 15 overlying the chain conveyor at its forward end. A pair of journalled rollers 16 supported on brackets 17 suitably positioned on the hopper forward wall assist in introduction of the pallets thereinto.

As the pallets progress along the conveyor 12 a rotary brush 20, and/or other equivalent assisting means, such as an oiling pipe, is disposed transversely across the conveyor in position to contact and scrape clean the pallet top surface. Driving means for the brush 20, or alternative oiling pipe, consists of a power take off from the shaft 22, which drives the chain conveyor 12, and upon the opposite end has a keyed driven sprocket member for reception of a link belt 23 that is driven in timed synchronism from a power takeoff 24 on the main block machine. Synchronism of the conveyor chain 12 with operation of the block machine is essential, of course, so that pallets will arrive at the pallet elevator E beneath the molding station M in timed sequence with the machine operation.

Arrival of the pallet at the inner end travel of the conveyor chain 12 places the pallet in position to be picked up by a pair of spaced pallet lifting arms 26, with positioning lugs 27 thereon, which accurately locates the pallet and lift it off the conveyor chain for transfer to the pallet receiver elevator E, to be raised to a position closing the open bottom of the mold station M. At the molding station a feed drawer is advanced forward over the mold to charge it with the agglomerate mix. A pair of spaced vibrators V provide measured vibration to the mold and its contents for densely compacting the material therein and freeing it of any entrained air bubbles. During a portion of the vibrating cycle the pressure head 11 is lowered into the top of the mold to rest on the contents therein for vibration under pressure and to reduce the height of the block to a predetermined uniform amount. Thereafter, through a series of cam controlled and limit switch operations, vibration is halted and the pressure head H is lowered by means of the support arm 30 guided along the flat way bars 31 upon the lower ends of which are disposed the spaced transversely extended arms 32 to move in unison therewith for lowering the pallet elevators E. As will now be apparent, this lowers the block loaded pallet and elevators away from the mold bottom to thereby strip the mold and replace the elevators in position for a fresh empty pallet.

Concurrently with the lowering of the green molded block loaded pallet, a pair of transversely spaced block moving bars 35 move into position under the pallet and a plurality of short finger means 36 thereon assume the burden of the block loaded pallet. Actuation of the block moving bars is controlled through a block moving cam 38 on the machine and assorted linkage 40—42, bell crank 43 and tension loading springs 44. As the block moving bars are advancing the block loaded pallet forward away from under the mold station a somewhat similar pair of transversely spaced pallet placing bars 50 disposed therebeneath, including short finger means 51, realign a fresh pallet on the pallet receiver E beneath the molding station M. This pallet placing means is actuated from the same cam 38 and linkage 40—43, only in timed sequence of course to the block moving means, by means of the linkage 53—55 and bell crank 56.

The block moving bars advance the green molded block loaded pallet forward first unto a rear ladder-like gravity conveyor 60 including a series of freely rotating rungs 61 stretched between side rails 62 which are pivotally supported at their forward ends by the frame members 10. The pivotal support of the side rails 62 enable lifting up and rotating this conveyor 60 for adjustment of and/or access to the pallets there beneath on the pallet conveyor 12. A second or so-called front gravity conveyor 65 is disposed in parallel alignment and longitudinally forward of the rear gravity conveyor 60. This conveyor 65 consists of transversely spaced, but unconnected, side rails 66 which journal a series of freely rotating rollers 67. The side rails 66 are extended forward and bent back upon themselves to form a tapered entrance 68 for easy reception of the offbearing hoist therebetween to pick up the pallet P and block B thereupon. Stop means 69 arrest and store loaded pallets until removal. These stops 69 consist of leading edge pallet arresting upturned ends 69a and rearwardly spaced comparable portions 69b. Intermediate the stops 69a and 69b the members 69 are fulcrumed between the side rails 66 at a point closer to 69a than 69b so that in free position the stops 69a are in the up position above the plane of the side rails 66 while the stops 69b are below the plane thereof to permit the first pallet to pass freely along the rollers 67 to the stops 69a. After the pallet P has been arrested at the outer ends of the conveyor by the stops 69a the pallet weight automatically tilts upward the stops 69b just back of the rearward edge of the pallet. Thus the next following pallet will be arrested by stops 69b and be prevented from striking the first pallet and possibly causing damage to the green block thereon.

Intimately associated with the foregoing described front pallet return mechanism, is a novel preferred form of offbearing hoist which works in conjunction therewith, and is best shown in Figs. 1, 3 and 4. The offbearing hoist for conveying away the green block is of the fluid power operated type employing a novel magnetic pickup for retention of empty pallets on the underside thereof. A suitably braced swingable jib crane or knuckled boom 70 is carried by a pivotally mounted mast 71 suitably supported on the frame of the molding machine as shown by the base member 72 and tie brackets 73. The mast may be separately supported, of course, if desired. Bottom truss members 74, 75 interlaced diagonal struts 76, a vertical plate 77 and the vertical pivotal knuckle 78 complete the supporting structure for a horizontally disposed fluid power operated cylinder 80. An extensible and retractible composite piston member 81 operable in the cylinder has a sheave type roller 82 connected to an outer end thereof over which is trained a wire cable or flexible link member 83. One end of the cable 83 is connected to a fixed abutment 84 and the other end is trained over a second fixed roller sheave 85, supported at the outer end of the boom 70, and left in depending relation for connection with an elongated generally C-shaped built up metal channel member 87, of light weight construction consistent with the load to be carried.

The lower arm of the composite generally C-shaped member 87 comprises two parallel horizontally extending load supporting members 88 spaced apart an amount equal to conveniently support the pallets P thereon and able to clear the gap between the side rails 66 of the front conveyor 65 when introduced into the tapered entrance 68. Plate member 90 interconnecting the load supporting arms 88 at the inner ends serves as a lower support for a pair of spaced and disposed wing-like elongated handle controls 92 while an upper plate 93 on member 87, forms a support for the upper ends of the handle controls. Plate 93 also serves as a support for a pair of conventional fluid power valves (not shown) which control raising and lowering of the offbearer through valve actuator rods 95 coextensive and parallel with the handle controls. Any hose means 96 may serve as fluid conductors to and from the power control valves to the power cylinder 80.

Suitably positioned and supported between the load supporting arms or forks 88, but projecting slightly below the plane thereof, are a pair of electro-magnets 98 and individual magnet disabling means 99. The magnets are so spaced as to overlie separate pallets magnetically attached thereto, while the magnet disabling means 99 are extended above the plane of the load supporting forks 88 in position to be actuated individually, in order, by the edge of the green block loaded pallet on the conveyor 65 over the mouth of the front pallet receiver hopper 15. The magnet disabling means may alternatively be located on the inner wall of conveyor 65. A rectifier 100 mounted on the upper frame of the block machine furnishes a source of low voltage direct current for energization of the magnets and a separate manual control switch 102 is mounted on member 87 for an overriding control.

Operation of the hoist and interrelated front pallet return in conjunction with the method of block handling as first proposed will now be made. As shown in Fig. 4, an offbearer operator has just deposited a load of green molded block loaded pallet upon the top deck of a multi-decked rack of empty pallets, which replaceable product receiver is normally disposed adjacent to the front delivery face of the block molding machine. As the offbearing hoist is retracted or withdrawn from between the decks and uprights of the rack, the empty hoist is lowered slightly so that the energized magnets approach the empty pallets therebelow on the next deck of the rack and automatically magnetically pick them up. At this point will be apparent the value of the elongated hoist handle controls 92, and valve actuators 95, which would be manipulated from adjacent the lower extremity thereof so that the operator would not have to stretch upward unnaturally, when filling the top deck of the rack, or bend down awkwardly when filling the lowest deck of the rack. Easy control for either extreme is effected by the operator simply sliding his hands upward or downward along the elongated handle controls to accommodate either condition. Likewise, the use of the C-shaped support 87 between the load bearing portion and the depending cable hanger of the hoist will be appreciated when it is understood that since the racks are loaded from the top downward, in order to magnetically pick up empty pallets on the under side of the offbearer, clearance must be provided between the offbearer support and the fresh block loaded pallets on the upper decks of the rack in C clamp fashion. That is to say, since the cable support of the offbearer is flexible it must necessarily support the load at the center of gravity of the contents for balanced horizontal conveyancing. In addition, horizontal positioning of the offbearer power cylinder 80 provides a desirable saving in the ceiling height or head room necessary for installation, when contrasted with previous vertical cylinder arrangements, while at the same time affording an equivalent range of vertical travel through the novel threading of the flexible support cable.

With the operator now having a set of empty pallets magnetically retained on the lower side of the offbearer he need only pivot around and introduce the hoist between the tapered entrance 68 of the conveyor 65 beneath the fresh block loaded pallets thereon. Simultaneously or concurrently with the offbearer being inserted between the rails of the conveyor 65, the magnet disabling means are actuated and the first empty pallet drops into the underlying pallet receiving hopper 15, as the hoist is further inserted, the second empty pallet is likewise disengaged automatically from the hoist. Thereafter the offbearer operator repeats the cycle by pivoting back around to face the adjacent rack of empty pallets and now with the top deck filled the next lower deck is stocked, etc. It will be apparent now that a single offbearer operator does the work formerly requiring two men, and additionally since he may offbear two pallets at a time he accomplishes more work with less steps and effort. Of course if desired the offbearing hoist could be arranged for one, two or more pallets by a mere mechanical alteration and still retain the novel features here presented. Moreover the offbearing hoist and front pallet return or feeder are so interrelated that it would be most awkward to employ two men to now do the combined functions which were formerly done separately in view of space limitations. This method of handling green molded block loaded pallets from the molding machine to the replaceable product receiver racks and automatically magnetically returning empty pallets to the machine also employs novel steps peculiarly suited to this apparatus.

From the foregoing description and disclosures of one form of the novel apparatus and method proposed it will be apparent that the objects and advantages of the invention first enumerated have been established. Moreover, obvious variations and mechanical equivalents will now be suggested to those skilled in this art, for example, the apparatus and method is adapted equally well to a molding machine employing cored pallets instead of the present plain pallets. However, it is not the intention to abandon such obvious mechanical equivalents and the scope of this invention is consistent with a fair interpretation of the breadth of the following claim.

What is claimed is:

Apparatus for use in conjunction with a building block making machine and a replaceable product receiver consisting of a multi-decked rack of empty pallets adjacent to the delivery face of the machine comprising in combination; a pallet retriever comprising an offbearing hoist arranged to receive block-loaded pallets from the block making machine for delivery to the top deck of the adjacent pallet rack, magnetic means associated with said off-bearing hoist arranged to retain empty pallets retrieved from the next to the top deck of the pallet rack, a pallet feeder operatively associated with the delivery face of said machine comprising a pallet storage magazine and conveyor arranged to receive said magnetically offborn pallets and feed them to the machine, and said pallet feeder including an oiling and cleaning means interposed between the feeder magazine and the machine.

References Cited in the file of this patent

UNITED STATES PATENTS

| Number | Name | Date |
|---|---|---|
| 489,634 | Hemphill et al. | Jan. 10, 1893 |
| 803,016 | Palmer et al. | Oct. 31, 1905 |
| 1,023,438 | Muncaster | Apr. 16, 1912 |
| 1,030,771 | Daugherty | June 25, 1912 |
| 1,184,648 | Horton | May 23, 1916 |
| 1,301,685 | Graham | Apr. 22, 1919 |
| 1,308,213 | Yingling | July 1, 1919 |
| 1,341,798 | Graham | June 1, 1920 |
| 1,425,449 | Cary | Aug. 8, 1922 |
| 1,524,877 | Norton | Feb. 3, 1925 |
| 1,595,384 | Cochran | Aug. 10, 1926 |
| 1,643,208 | Griffin | Sept. 20, 1927 |
| 1,695,327 | Goldston | Dec. 18, 1928 |
| 1,742,384 | Fitzgerald, Jr. | Jan. 7, 1930 |
| 1,835,914 | Stockdale | Dec. 8, 1931 |
| 1,836,690 | Talbot | Dec. 15, 1931 |
| 1,900,756 | Butts | Mar. 7, 1933 |
| 1,921,003 | Romie | Aug. 8, 1933 |
| 1,925,050 | Jagdmann et al. | Aug. 29, 1933 |
| 2,000,756 | Kohler | May 7, 1935 |
| 2,029,365 | Gelbman | Feb. 4, 1936 |
| 2,107,500 | Price et al. | Feb. 8, 1938 |
| 2,143,026 | Nordquist | Jan. 10, 1939 |
| 2,181,357 | Chapman | Nov. 28, 1939 |
| 2,216,276 | Mann et al. | Oct. 1, 1940 |
| 2,423,557 | Gray | July 8, 1947 |
| 2,496,000 | Bugenhagen | Jan. 31, 1950 |
| 2,510,573 | Gray | June 6, 1950 |

OTHER REFERENCES

Concrete Stone Manufacture, 2nd edition (1918), page 58 (plate 23), by Harvey Whipple, published by Concrete-Cement Age Publishing Co.

Concrete Block Manufacture, 1st edition (1906), page 77 (Fig. 21), by Harmon H. Rice, published by John Wiley & Sons.